(12) United States Patent
Tsukamoto et al.

(10) Patent No.: US 7,370,739 B2
(45) Date of Patent: May 13, 2008

(54) SHOCK ABSORBER WITH A FUNCTION OF TRANSMISSION OF ELECTRIC POWER BETWEEN SPRUNG AND UNSPRUNG PARTS OF A VEHICLE

(75) Inventors: Masahiro Tsukamoto, Yokohama (JP); Yasuhiko Kitajima, Kanagawa (JP); Kouichirou Yonekura, Kanagawa (JP); Tetsuya Niikuni, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/913,410

(22) Filed: Aug. 9, 2004

(65) Prior Publication Data
US 2005/0034941 A1 Feb. 17, 2005

(30) Foreign Application Priority Data
Aug. 11, 2003 (JP) ............................. 2003-291058
Sep. 2, 2003 (JP) ............................. 2003-310459

(51) Int. Cl.
*F16D 57/00* (2006.01)
*F16D 65/36* (2006.01)
(52) U.S. Cl. ................... 188/267; 188/156; 188/1.11 E
(58) Field of Classification Search ................ 188/266, 188/156, 158, 159, 160, 1.11 R, 1.11 E, 267; 340/686.4; 200/61.58 R
See application file for complete search history.

(56) References Cited

U.S. PATENT DOCUMENTS 3,948,359 A * 4/1976 Rogers .................. 188/1.11 R
4,163,970 A    8/1979 Allinquant et al.
4,316,098 A    2/1982 Freitag et al.
4,317,014 A * 2/1982 Langanke ................. 200/61.62
4,667,940 A * 5/1987 Jaillet ....................... 267/64.11
5,003,136 A * 3/1991 Valenzona ............... 200/61.62
5,143,542 A * 9/1992 Miyazawa et al. ............ 75/349

FOREIGN PATENT DOCUMENTS

| DE | 73 04 750 U | 8/1973 |
| DE | 3405315 A1 | 8/1985 |
| JP | 4-18739 | 1/1992 |
| JP | 11-18212 | 1/1999 |
| WO | WO-9100186 A1 * | 1/1991 |

OTHER PUBLICATIONS

Japanese Office Action issued in corresponding Japanese Patent Appln. No. JP 2003-291058, dated Feb. 20, 2007.
European Search Report, issued in corresponding European Patent Application No. 04 018 404.6-1264 dated on Sep. 3, 2007.

* cited by examiner

*Primary Examiner*—Melody M. Burch
(74) *Attorney, Agent, or Firm*—McDermott Will & Emery LLP

(57) ABSTRACT

A shock absorber has a function of transmitting electric power between sprung and unsprung electrical components. The shock absorber includes a pair of conductive elements. The conductive elements are coupled electrically to each other. One of the conductive elements is attached to the rod of the shock absorber. The other conductive element is mounted within the tube.

9 Claims, 11 Drawing Sheets

SHOCK ABSORBER WITH A FUNCTION OF TRANSMISSION OF ELECTRIC POWER BETWEEN SPRUNG AND UNSPRUNG PARTS OF A VEHICLE

BACKGROUND OF THE INVENTION

The present invention relates generally to apparatuses having a function of transmitting electric power between sprung and unsprung parts of a vehicle, and more particularly to a shock absorber having a function of transmitting electric power between sprung and unsprung parts of a vehicle.

In recent years, there have been developed various electric vehicles for environmental protection. In particular, compact electric vehicles with a short distance per charge become widely available. Some of the compact electric vehicles include an electric motor attached to a wheel assembly, to use the limited space efficiently. On the other hand, an electric brake system, which is driven by an electric motor instead of a hydraulic circuit, is under study, to reduce liquid waste of brake fluid. These vehicles need electric power supply from sprung parts (body) to unsprung electrical components, especially electric motors, near wheel assemblies. In general, electrical components and power supply are directly connected with wire in electric vehicles. In middle size electric vehicles, the strokes of suspensions are long to provide preferable ride, and the thicknesses of wires are large in accordance with large capacities of motors. In this structure, bended repeatedly, the wire may get fatigued to break. Japanese Patent Provisional Publication No. 11-18212 (JP11-18212) discloses a technique against this problem. In JP11-18212, a power supply system includes a first coil as a sprung component, and a second coil as an unsprung element. Electric power is transmitted by electromagnetic induction between the pair of the coils. In other words, a transformer is formed to transmit electric power between sprung parts to unsprung parts.

SUMMARY OF THE INVENTION

The function of a transformer depends largely on the paths of magnetic fluxes surrounded by the coils. In the technique disclosed in JP11-18212, a major part of the flux paths extends through nonmagnetic materials, resulting in a low efficiency of transmission of electrical energy. In addition, the apparatus is configured to be disposed outside a shock absorber, or is newly attached to an element of a suspension link. There is a potential interference between the apparatus and an element of the suspension, leading to a difficulty in mounting the apparatus.

Accordingly, it is an object of the present invention to provide a shock absorber having a function of transmitting electric power efficiently between sprung and unsprung parts of a vehicle, without causing interference with other elements of the vehicle.

In order to accomplish the aforementioned and other objects of the present invention, a shock absorber comprises a tube having one end closed, a rod having one end inserted within the tube for motion in its longitudinal direction, a first conductive element mounted on an outer peripheral surface of the rod, and a second conductive element mounted within the tube and coupled electrically with the first conductive element. At least one of the first conductive element and the second conductive element may extend along a path of the motion of the rod, to hold the electrical coupling between the first conductive element and the second conductive element.

According to another aspect of the invention, a shock absorber comprises a tube having one end closed, a rod having one end inserted within the tube for motion in its longitudinal direction, first electrical means for being mounted on an outer peripheral surface of the rod, and second electrical means for being mounted within the tube and coupled electrically with the first electrical means.

The above objects and other objects, features, and advantages of the present invention are readily apparent from the following detailed description of the best modes for carrying out the invention when taken in connection with the accompanying drawings.

DETAILED DESCRIPTION OF THE INVENTION

Figure 1:
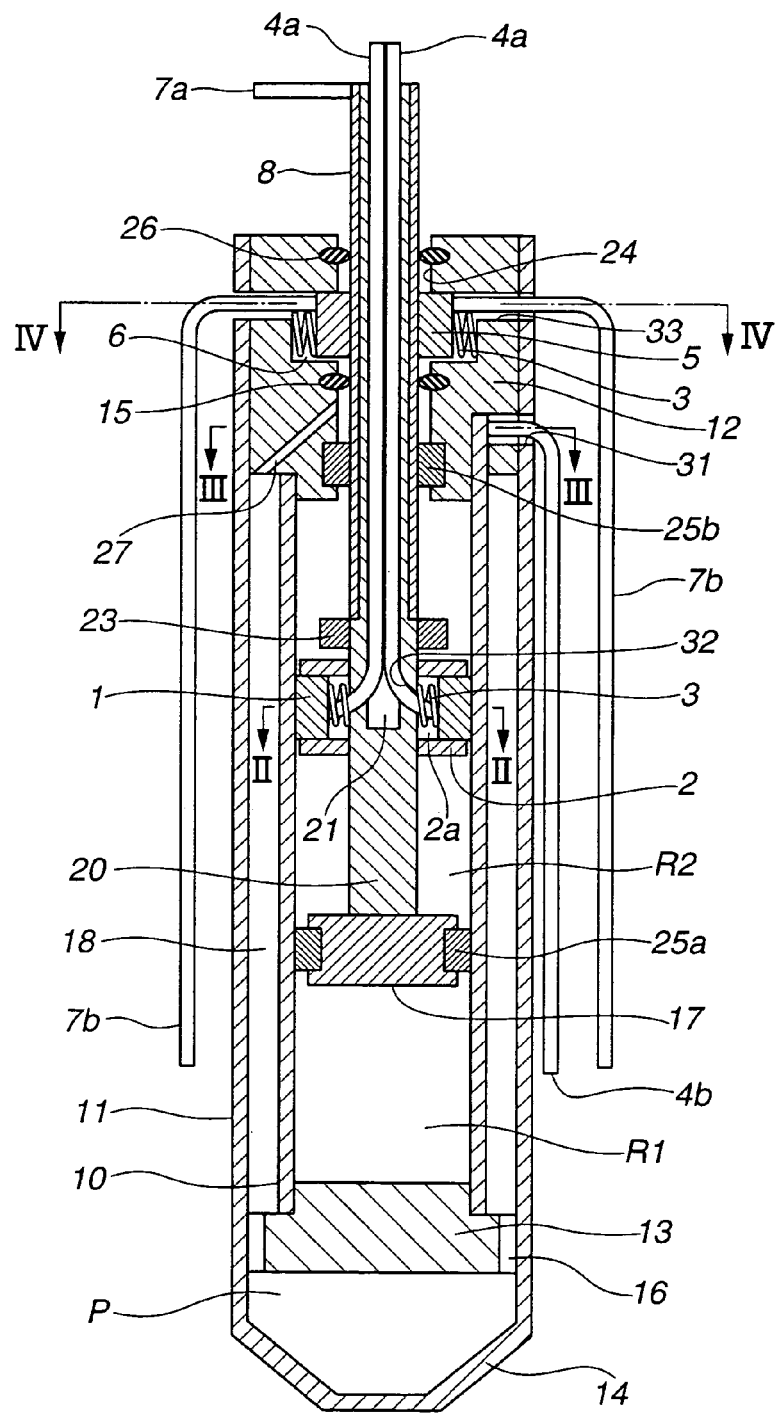
FIG. 1 is a longitudinal sectional view of a shock absorber in accordance with a first embodiment of the present invention.

Referring now to FIG. 1, there is shown a longitudinal sectional view of a twin-tube shock absorber in accordance with a first embodiment of the present invention. The shock absorber includes a tube having an inner tube 10 and an outer tube 11 surrounding inner tube 10. Inner tube 10 and outer tube 11 are coaxially arranged with inner tube 10 inside. Inner tube 10 and outer tube 11 are coupled at their upper end portions by an end cap 12 and at their lower end portions by a base valve 13. Outer tube 11 is hermetically blocked at its lower end by an end cover 14. Between inner tube 10 and outer tube 11 is defined an annular reservoir chamber 18. In the upper portion of reservoir chamber 18 is enclosed a low-pressure gas. Between base valve 13 and end cover 14 is defined a base chamber P. Base valve 13 includes a portion defining a communication hole 16 in the peripheral portion thereof. Reservoir chamber 18 is hydraulically connected via communication hole 16 to base chamber P. The gas enclosed in the upper portion of reservoir chamber 18 absorbs the change in the volume of a portion of a rod such as a piston rod 20 in inner tube 10 in accordance with the telescopic motion of the shock absorber.

Slidably mounted within inner tube 10, a piston 17 separates the inner space of inner tube 10 into a pair of chambers including a lower hydraulic chamber R1 and an upper hydraulic chamber R2. Piston 17 is coupled to an inserted end of piston rod 20 for linear motion therewith in the longitudinal direction of inner tube 10. End cap 12 includes a portion defining a through bore 24 extending in the longitudinal direction. Extending in the longitudinal direction of inner tube 10, piston rod 20 is in sliding contact with through bore 24 of end cap 12. The outside end or the upper end of piston rod 20 extends above inner tube 10 and outer tube 11. The upper end portion of piston rod 20 is coupled to a sprung component of the vehicle or a vehicle body (not shown). On the other hand, outer tube 11 or end cover 14 is is coupled to an unsprung component of the vehicle or a wheel assembly (not shown).

Inner tube 10 is formed of an inductive metal. Inner tube 10 includes an upper end portion extending within end cap 12. Outer tube 11 and end cap 12 include a hole 31 extending between the upper end portion of inner tube 10 and the outside of outer tube 11. The upper end portion of inner tube 10 is connected to a wiring harness 4b. Wiring harness 4b extends out of hole 31, to be connected to a first terminal of an unsprung electrical component. Inner tube 10 is insulated electrically from end cap 12 by an electrical insulator such as a resin (not shown).

Piston rod 20 includes a rebound stopper 23 formed into a circular plate. Rebound stopper 23 is located a predetermined distance above piston 17, to limit a maximum displacement of piston 17 on the extension stroke. In addition, piston rod 20 includes a brush holder 2 below rebound stopper 23, and a portion defining a center bore 21 longitudinally extending between the upper end thereof and brush holder 2.

Figure 2:
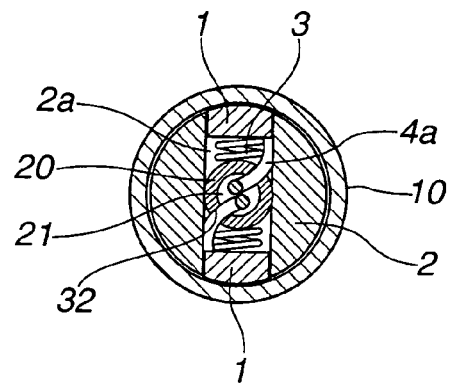
FIG. 2 is a cross sectional view taken along the plane indicated by the line II-II in FIG. 1.

Fixed to piston rod 20, brush holder 2 defines a brush chamber 2a disposed between piston rod 20 and inner tube 10 and open to the inner surface of inner tube 10. In brush chamber 2a is disposed a brush 1 and a spring 3. Biased toward the inner surface of inner tube 10 by spring 3, brush 1 is in sliding contact with the inner surface of inner tube 10. Piston rod 20 includes a portion defining a through hole 32 for connection between brush chamber 2a and center bore 21. In brush holder 2, a plurality of brush chambers 2a are arranged outwardly and uniformly around piston rod 20. This arrangement brings the forces applied to piston rod 20 by spring 3 in balance. FIG. 2 shows a cross sectional view taken along the plane indicated by the line II-II in FIG. 1. In brush holder 2 are disposed two brush chambers 2a in opposed directions or at intervals of 180°.

Brush 1 is insulated electrically from spring 3 and brush holder 2, for example, by coating brush 1 with a resin except the contact surface with the inner surface of inner tube 10. Brush 1 is connected to one end of a wiring harness 4a. Wiring harness 4a extends via hole 32 and center bore 21, above the upper end of piston rod 20. The other end of wiring harness 4a is connected to a first terminal of a power supply. After mounting wiring harness 4a, center bore 21 is filled with a resin to ensure the hermeticity of the hydraulic fluid in the shock absorber.

On an upper portion of the outer peripheral surface of piston rod 20 between rebound stopper 23 and the outside end of piston rod 20 is fixed an electrode plate 8 as a first electrode plate, which is a tubular element formed of an inductive material. Electrode plate 8 is insulated electrically from piston rod 20 by a tubular electrical insulator formed of a resin (not shown). The upper end portion of electrode plate 8 includes a portion connected to one end of a wiring harness 7a. The other end of wiring harness 7a is connected to a second terminal of the electric power supply.

Figure 3:
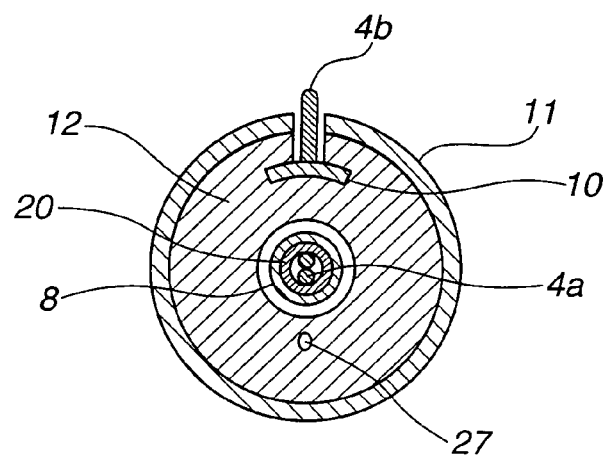
FIG. 3 is a cross sectional view taken along the plane indicated by the line III-III in FIG. 1.

On the inner surface of through bore 24 of end cap 12 is disposed an oil seal 15, a dust seal 26, a sliding seal 25b. Oil seal 15 is in sliding contact with the outer peripheral surface of piston rod 20 so that the contact is hermetically sealed. Disposed above oil seal 15, dust seal 26 prevents the entry of dust. Sliding seal 25b slidably supports piston rod 20. End cap 12 includes a portion defining a through hole 27 extending between reservoir chamber 18 and a portion of the inner surface of center bore 21 below oil seal 15. During the shock absorber being extending, the hydraulic fluid leaked via sliding seal 25b from upper hydraulic chamber R2 is released to reservoir chamber 18 via through hole 27. FIG. 3 shows a cross sectional view taken along the plane indicated by the line III-III in FIG. 1. On the side of the section opposite to through hole 27, the upper end portion of inner tube 10 extends more deeply within end cap 12 to be connected with wiring harness 4b.

Figure 4:
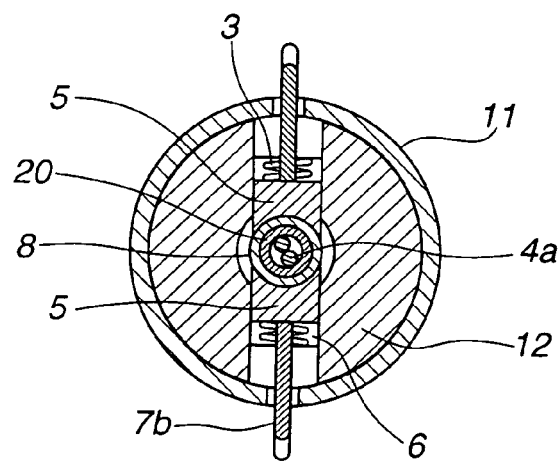
FIG. 4 is a cross sectional view taken along the plane indicated by the line IV-IV in FIG. 1.

End cap 12 includes a portion defining a brush holder 6 in the wall of through bore 24 between oil seal 15 and dust seal 26. In brush holder 6 is disposed a brush 5 and spring 3. Biased inwardly toward electrode plate 8 by spring 3, brush 5 is in sliding contact with electrode plate 8 around piston rod 20. Brush 5 is insulated electrically from spring 3 and end cap 12, for example, by coating brush 5 with a resin except the contact surface with electrode plate 8. Brush holder 6 includes a through hole 33 open to the outside of outer tube 11. A plurality of brush holders 6 are arranged uniformly in radial directions around electrode plate 8. This arrangement brings the forces applied to electrode plate 8 by spring 3 in balance. FIG. 4 shows a cross sectional view taken along the plane indicated by the line IV-IV in FIG. 1. Two brush holders 6 are disposed in opposed directions or at intervals of 180°.

Brush 5 is connected to one end of a wiring harness 7b. Wiring harness 7b extends out of brush holder 6, via hole 33, to be connected to a second terminal of the unsprung electrical component. Brushes 1 and 5 are constructed by implanting a plurality of thin wires of an inductive metal on an inductive element. The thin wires of each of brushes 1 and 5 are in elastic and sliding contact with an associated one of inner tube 10 and electrode plate 8, to produce an electrical coupling. Wiring harnesses 4a, 4b, 7a, and 7b are formed of inductive materials the outer walls of which are coated with electrical insulators.

Base valve 13 includes a pair of leaf valves (not shown), as in the case of an ordinary shock absorber of the twin tube type. One leaf valve generates a fluid resistance in the flow from lower hydraulic chamber R1 to reservoir chamber 18 via base chamber P, to produce a damping force, during the compression stroke. The other leaf valve generates a fluid resistance in the flow from reservoir chamber 18 to lower hydraulic chamber R1 via base chamber P, to produce a damping force, during the extension stroke. Similarly, piston 17 includes a pair of leaf valves (not shown). One leaf valve generates a fluid resistance in the flow from upper hydraulic chamber R2 to lower hydraulic chamber R1, to produce a damping force, during the extension stroke. The other leaf valve generates a fluid resistance in the flow from lower hydraulic chamber R1 to upper hydraulic chamber R2, to produce a damping force, during the compression stroke. Attached to the outer peripheral surface of piston 17, a sliding seal 25a is disposed in sliding contact with the inner peripheral surface of the side wall of inner tube 10. The main body of base valve 13 and sliding seal 25a are formed of electrical insulators such as resins, to insulate base valve 13 electrically from inner tube 10, or to insulate piston 17 electrically from inner tube 10. FIG. 1 shows the main bodies of base valve 13 and piston 17 without specific structures.

The following describes operations of the shock absorber in accordance with the first embodiment. In this embodiment, piston rod 20, and the elements attached to piston rod 20, that is, piston 17, brush holder 2, rebound stopper 23, electrode plate 8, wiring harness 4a, and wiring harness 7a, are sprung elements. The other elements of the shock absorber are unsprung elements. Accordingly, when the relative motion between the sprung and unsprung parts of the vehicle is generated during the vehicle traveling, brushes 1 and 5 move in the longitudinal direction in contact with the inner surface of inner tube 10 and electrode plate 8, respectively. In addition, brush 1 and brush 5 are relatively and rotatably slidable in contact with inner tube 10 and electrode plate 8, respectively. The thin wires of brush 1 are in elastic contact with inner tube 10, so that the electrical coupling is held in a preferable condition even while the contact is wet with hydraulic fluid. The thin wires of brush 5 are in contact with electrode plate 8, on which oil seal 15 removes hydraulic fluid, so that the electrical coupling is held in a preferable condition.

In case electric power is transmitted in direct current between the sprung and unsprung parts of the vehicle, electric current is supplied to wiring harness 4a, transmitted via brush 1 to inner tube 10, and finally transmitted via wiring harness 4b to an unsprung electrical component. Electric current from the unsprung electrical component is transmitted from wiring harness 7b via brush 5 to electrode plate 8, and finally transmitted via wiring harness 7a to a negative pole of the power supply.

In the shock absorber in accordance with the first embodiment, electric power is transmitted through contact electrical coupling between brush 1 and inner tube 10, and between brush 5 and electrode plate 8, resulting in a higher efficiency of transmission of electric power. In addition, the telescopic motion of the shock absorber causes no bending of the wiring harnesses. This prevents a fatigue breakdown of a wiring harness for electric power supply.

The shock absorber of the shown embodiment may be employed as a strut of a strut suspension, which is widely used as a front suspension for steerable wheels of an automotive vehicle. The outer tube of the shock absorber is attached to an axle member swinging in accordance with steering operation. In such a case, the outer tube of the shock absorber needs to rotate with reference to the piston rod, in addition to the telescopic motion. In the shown embodiment, brush 1 and brush 5 are rotatable on the longitudinal axis of piston rod 20, in sliding contact with inner tube 10 and electrode plate 8, respectively, in addition to the telescopic motion. Accordingly, the shock absorber allows a relative rotary motion of the piston rod and the outer tube in accordance with steering operation. Therefore, the shock absorber of the shown embodiment is suitable especially for the strut of a strut suspension.

In the shown embodiment, the shock absorber includes a plurality of insulators disposed between elements for ensuring electrical insulation. Alternatively, piston 17, end cap 12, and brush holder 2 may be formed of resin, to be insulated electrically from inner tube 10, brush 1, or brush 5.

Figure 5:
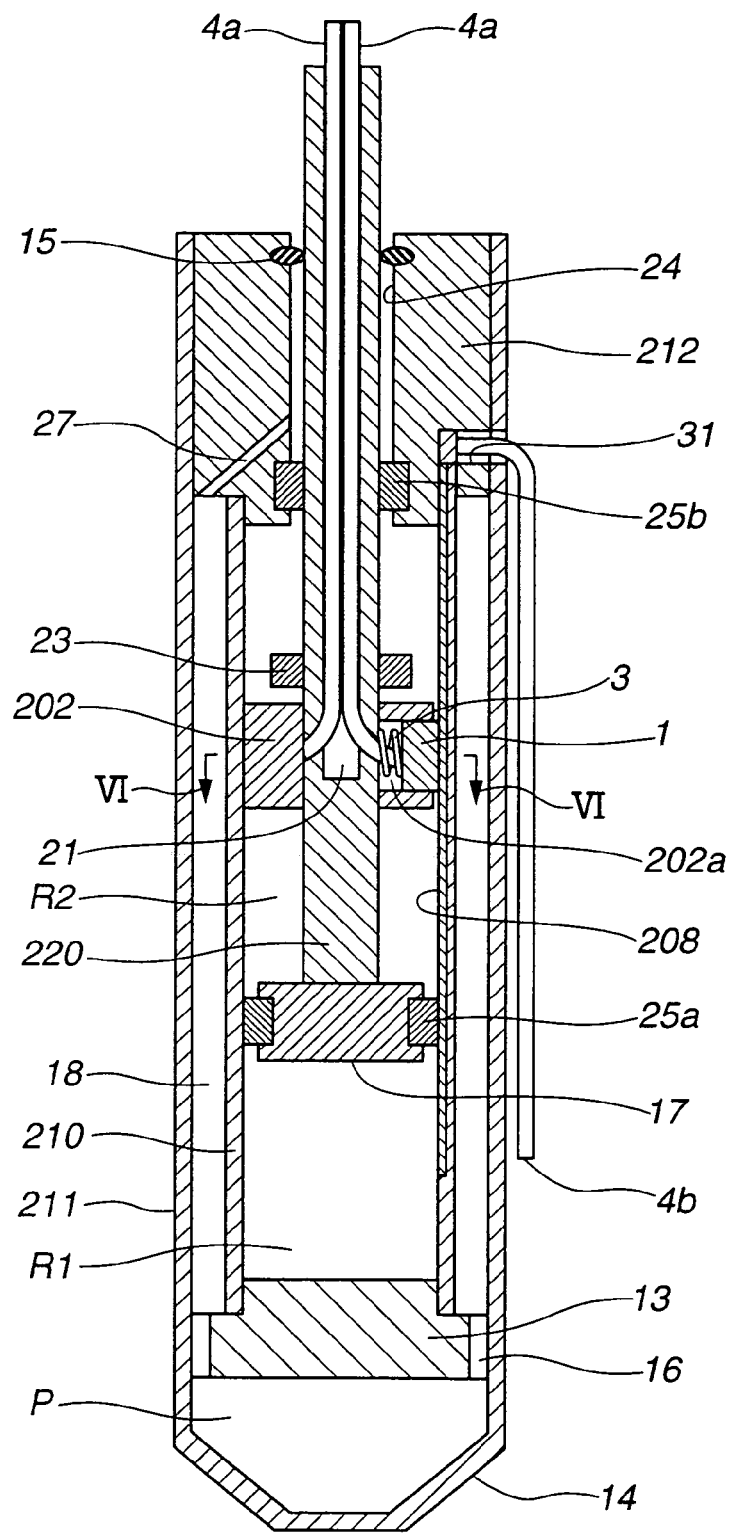
FIG. 5 is a longitudinal sectional view of a shock absorber in accordance with a second embodiment of the present invention.

Referring now to FIG. 5, there is shown a shock absorber in accordance with a second embodiment of the present invention. Common elements shared between the first and second embodiments are indicated by the same reference signs. The following describes the structure of the shock absorber, especially added or modified elements other than the common elements. In the first embodiment, inner tube 10 is formed of an inductive material, to have a function of an electrode plate. On the other hand, in the second embodiment, extending along the longitudinal axis of the shock absorber, three electrode plates 208 are disposed on the inner surface of inner tube 210 via an electrical insulator. Electrode plates 208 are separated in the circumferential direction at intervals of a central angle of 120°, and insulated electrically from each other. The central angle is measured with respect to the center axis of inner tube 210 or the shock absorber. The width of electrode plate 208 in the circumferential direction is corresponding to a central angle of 115°, so that a clearance between electrode plates 208 is a distance corresponding to a central angle of 5°. Between electrode plate 208 and end cap 212 is disposed an electrical insulator such as a resin (not shown) to insulate them electrically from each other. Base valve 13 and sliding seal 25a are each formed of an electrical insulator such as a resin, to insulate electrode plate 208 and base valve 13 electrically from each other, and to insulate electrode plate 208 and piston 17 electrically from each other.

Figure 6:
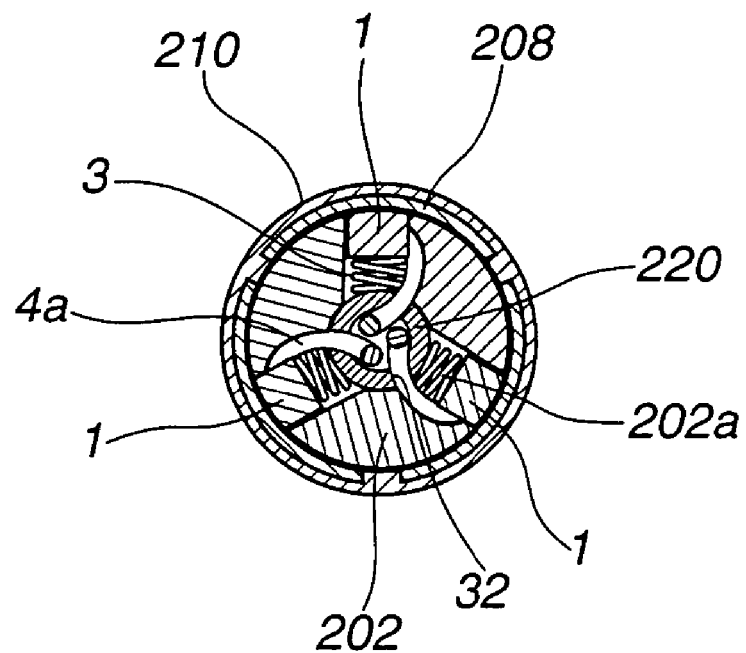
FIG. 6 is a cross sectional view taken along the plane indicated by the line VI-VI in FIG. 5.

Surrounding piston rod 220, brush holder 202 is disposed below rebound stopper 23, as in the case of the first embodiment. FIG. 6 shows a cross sectional view taken along the plane indicated by the line VI-VI in FIG. 5. Brush holder 202 includes three brush chambers 202a facing to the inner surface of electrode plate 208. Brush chambers 202a are disposed at intervals of a central angle of 120°. Disposed in each brush chamber 202a, brush 1 is biased outward by spring 3 to be in sliding contact with electrode plate 208. Coated with a resin except the surface in contact with electrode plate 208, brush 1 is insulated electrically from spring 3 and brush holder 202. Brush 1 is connected to one end of wiring harness 4a. Three wiring harnesses 4a extend via hole 32 and center bore 21, above the upper end of piston rod 220. The length of the contact portion in the circumferential direction between brush 1 and electrode plate 208, for example, is corresponding to a central angle of 20°. Center bore 21 is filled with a resin to prevent the leakage of hydraulic fluid.

In the first embodiment, the shock absorber includes electrode plate 8 attached to the upper portion of the outer surface of piston rod 20 above rebound stopper 23, and brush holder 6 disposed in end cap 12 and accommodating brush 5 and spring 3. On the other hand, the shock absorber in accordance with the second embodiment does not include these elements. Incidentally, oil seal 15, disposed between end cap 212 and piston rod 220, has functions of preventing the entry of dust and sealing hermetically.

In the shown embodiment, brush 1 as a sprung element and electrode plate 208 as an unsprung element are in sliding contact with each other, to allow transmission of electric power between sprung and unsprung parts of the vehicle. Each of three electrode plates 208 insulated electrically from each other is connected electrically with wiring harness 4a and wiring harness 4b. Accordingly, the shock absorber may include a motor driven by a three-phase alternating current, as a sprung element, and an inverter for controlling and supplying the three-phase alternating current, as an unsprung element.

In the shown embodiment, the widths of brush 1 and electrode plate 208 in the circumferential direction are set to distances corresponding to central angles of 20° and 115°, respectively. Accordingly, the allowable range of the relative angular displacement between the sprung and unsprung elements of the shock absorber is between −47.5° and +47.5°. On the other hand, a maximum steer angle is set to 45° or near, in general. Thus, each of the brushes 1 keeps in contact with an associated one of the electrode plates 208 during a relative angular displacement between piston rod 220 and electrode plate 208 being in a predetermined range. Therefore, the shock absorber including at most three electrode plates 208 in accordance with the shown embodiment may be employed as a strut of a front suspension. The main body of piston 17, end cap 212, and brush holder 202 may be formed of a resin, to be insulated electrically from electrode plate 208 or brush 1.

The shock absorber in accordance with the second embodiment may be modified, as follows. The shock absorber in this variation is constructed by adding modified elements of the first embodiment to the shock absorber of the second embodiment. The combination of brush 5 in end cap 12 and electrode plate 8 attached to piston rod 20 is included. The shock absorber includes a pair of electrode plates 8 arranged in the circumferential direction. The electrode plates 8 are insulated from each other, and each connected to wiring harness 7a. Each brush 5 facing an associated one of electrode plates 8 is connected to wiring harness 7b. This provides a pair of electric passages of direct current or a channel of single-phase alternating current, as a first channel. Three combinations of brush 1 and electrode plate 208 in accordance with the second embodiment provides a channel of three-phase alternating current, as a second channel. Therefore, in the shown embodiment, the shock absorber includes two channels of transmission of electric power between the sprung and unsprung elements of the vehicle.

The previously discussed embodiments employ a twin-tube shock absorber as a basic structure. Alternatively, a single-tube shock absorber may be employed.

Figure 7:
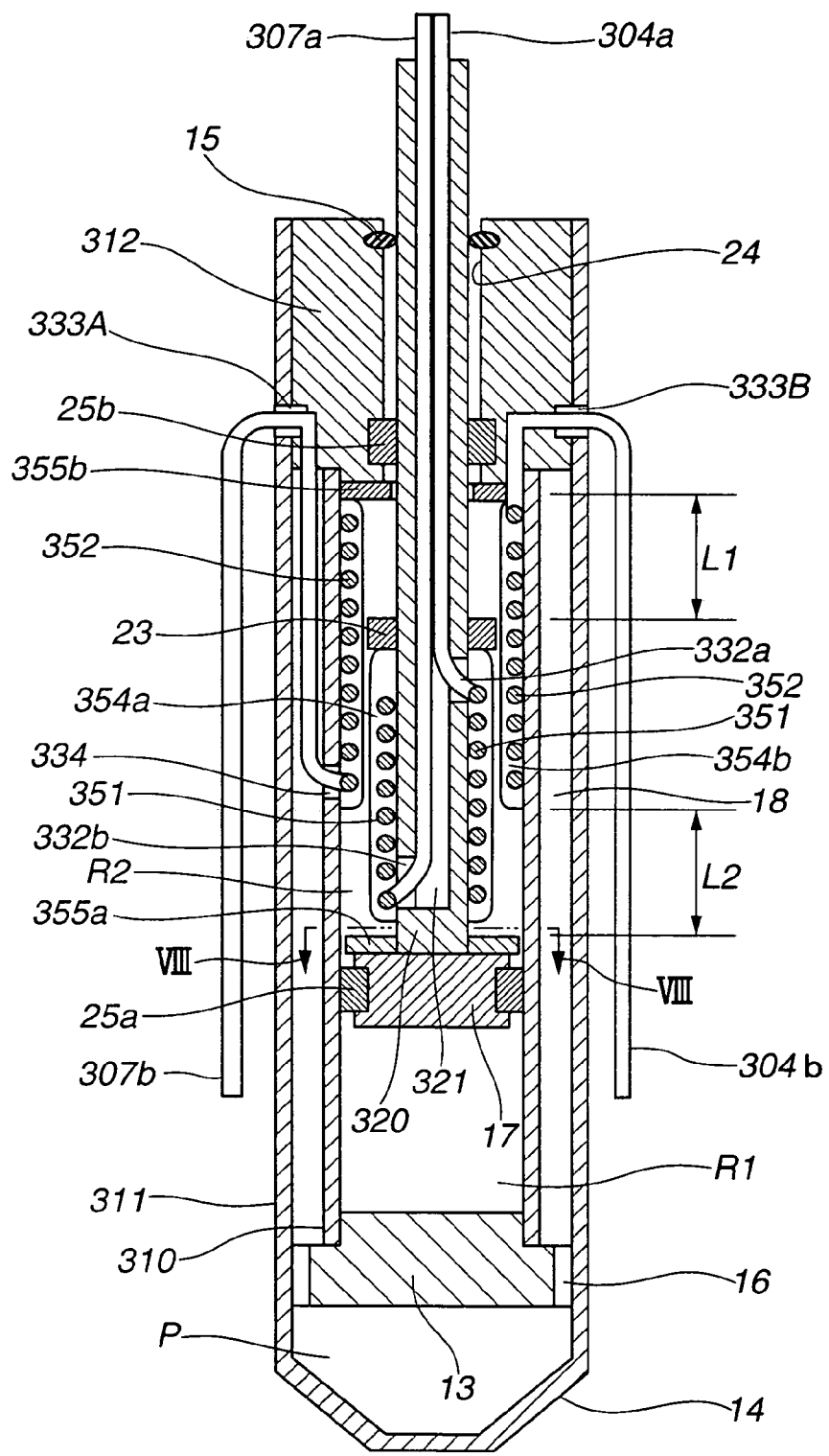
FIG. 7 is a longitudinal sectional view of a shock absorber in accordance with a third embodiment of the present invention.

Referring now to FIG. 7, there is shown a longitudinal sectional view of a twin-tube shock absorber in accordance with a third embodiment of the present invention. The shock absorber includes a tube having an inner tube 310 and an outer tube 311 surrounding inner tube 310. Inner tube 310 and outer tube 311 are coaxially arranged with inner tube 310 inside. Inner tube 310 and outer tube 311 are coupled at their upper end portions by an end cap 312 and at their lower end portions by a base valve 13. Outer tube 311 is hermetically blocked at its lower end by an end cover 14. Between inner tube 310 and outer tube 311 is defined an annular reservoir chamber 18. In the upper portion of reservoir chamber 18 is enclosed a low-pressure gas. Between base valve 13 and end cover 14 is defined a base chamber P. Base valve 13 includes a portion defining a communication hole 16 in the peripheral portion thereof. Reservoir chamber 18 is hydraulically connected via communication hole 16 to base chamber P.

Slidably mounted within inner tube 310, a piston 17 separates the inner space of inner tube 310 into a pair of chambers including a lower hydraulic chamber R1 and an upper hydraulic chamber R2. Piston 17 is coupled to an inserted end of piston rod 320 for linear motion therewith in the longitudinal direction of inner tube 310. End cap 312 includes a portion defining a through bore 24 extending in the longitudinal direction. Extending in the longitudinal direction of inner tube 310, piston rod 320 is in sliding contact with through bore 24 of end cap 312. The outside end or the upper end of piston rod 320 extends above inner tube 310 and outer tube 311. The upper end of piston rod 320 is coupled to a sprung component of the vehicle or a vehicle body (not shown). On the other hand, outer tube 311 or end cover 14 is coupled to an unsprung component of the vehicle or a wheel assembly (not shown).

Base valve 13 includes a pair of leaf valves (not shown), as in the case of an ordinary shock absorber of the twin tube type. One leaf valve generates a fluid resistance in the flow from lower hydraulic chamber R1 to reservoir chamber 18 via base chamber P, to produce a damping force, during the compression stroke. The other leaf valve generates a fluid resistance in the flow from reservoir chamber 18 to lower hydraulic chamber R1 via base chamber P, to produce a damping force, during the extension stroke. Similarly, piston 17 includes a pair of leaf valves (not shown). One leaf valve generates a fluid resistance in the flow from upper hydraulic chamber R2 to lower hydraulic chamber R1, to produce a damping force, during the extension stroke. The other leaf valve generates a fluid resistance in the flow from lower hydraulic chamber R1 to upper hydraulic chamber R2, to produce a damping force, during the compression stroke. Attached to the outer peripheral surface of piston 17, a sliding seal 25a is disposed in sliding contact with the inner peripheral surface of the side wall of inner tube 310. FIG. 1 shows the main bodies of base valve 13 and piston 17 without specific structures. The gas enclosed in the upper portion of reservoir chamber 18 absorbs the change in the volume of a portion of piston rod 320 in inner tube 310 in accordance with the telescopic motion of the shock absorber.

Piston rod 320 is formed of a soft magnetic material. Piston rod 320 includes a rebound stopper 23, a coil 351 as a first coil, a portion defining a center bore 321, and a magnetically permeable ring 355a, in addition to piston 17 at its lower end. Rebound stopper 23 is formed into a circular plate, and is positioned a predetermined distance above piston 17, to limit a maximum displacement of piston 17 on the extension stroke. Coil 351 is attached to a portion of the outer peripheral surface of piston rod 320 between rebound stopper 23 and piston 17, wound counterclockwise from top to bottom in the top view. Coil 351 is covered and fixed with a molded resin 354a. Center bore 321 is disposed at the core of piston rod 320, extending between the upper end of piston rod 320 and the lower end of coil 351. Piston rod 320 includes a portion defining a side hole 332a at the upper end of coil 351, which extends between the center bore 321 and outer peripheral surface of piston rod 320, and a portion defining a side hole 332b at the lower end of coil 351, which extends between the center bore 321 and outer peripheral surface of piston rod 320. Coil 351 is connected at its upper end to one end of a wiring harness 304a and at its lower end to one end of a wiring harness 307a. Wiring harnesses 304a and 307a extend via hole 332a and hole 332b, above the upper end of piston rod 320, to be connected to the terminals of the sprung power supply. Hole 332a and hole 332b are filled with molded resin 354a, to ensure the hermeticity. After mounting wiring harnesses 304a and 307a, center bore 321 is filled with a resin to ensure the hermeticity of hydraulic fluid in the shock absorber.

Figure 8:
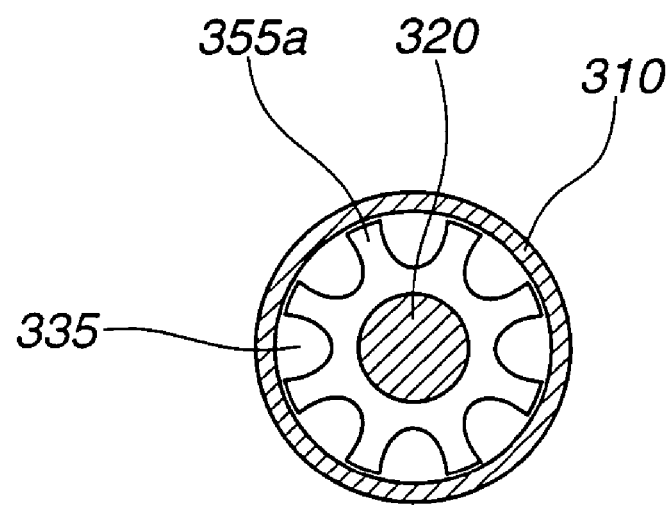
FIG. 8 is a cross sectional view taken along the plane indicated by the line VIII-VIII in FIG. 7.

Magnetically permeable ring 355a is a circular plate formed of a soft magnetic material. Magnetically permeable ring 355a is attached to a portion of the outer peripheral surface of piston rod 320 just above piston 17. FIG. 8 shows a cross sectional view taken along the plane indicated by the line VIII-VIII in FIG. 7. There is a small clearance between magnetically permeable ring 355a and the inner peripheral surface of the side wall of inner tube 310. In the outer peripheral surface of magnetically permeable ring 355a are formed a plurality of grooves 335 to provide a passage for hydraulic fluid between lower hydraulic chamber R1 and upper hydraulic chamber R2.

Inner tube 310 is formed of a soft magnetic material. On a portion of the inner peripheral surface of the side wall of inner tube 310 near end cap 312 is mounted a coil 352 as a second coil. Thus, coil 351 and coil 352 are coaxially located, with the outside diameter of coil 351 being smaller than the inside diameter of coil 352. As in the case of coil 351, coil 352 is wounded counterclockwise from top to bottom in the top view. Coil 352 is covered and fixed with a molded resin 354b. Inner tube 310 includes a portion defining a hole 334 extending between the inner and outer peripheral surfaces, at the lower end of coil 352. Coil 352 is connected at its upper end to one end of a wiring harness 304b and at its lower end to one end of a wiring harness 307b. End cap 312 includes a portion defining a through hole 333A extending between the outer peripheral surface of outer tube 311 and a portion of the bottom surface of end cap 312 that faces reservoir chamber 18. Similarly, end cap 312 includes a portion defining a through hole 333B extending between the outer peripheral surface of outer tube 311 and a portion of the bottom surface of end cap 312 that faces upper hydraulic chamber R2. Wiring harness 307b extends through hole 334 and reservoir chamber 18, to a lower end portion of end cap 312. Wiring harness 304b extends to the lower end portion of end cap 312. Wiring harnesses 304b and 307b extend through holes 333A and 333B, to be connected to the terminals of an unsprung electrical component. After mounting wiring harnesses 304b and 307b, holes 333A, 333B, and 334 are filled with a resin to ensure the hermeticity of hydraulic fluid in the shock absorber.

Incidentally, the outside diameters of molded resin 354a and rebound stopper 23 are set smaller than the inside diameters of molded resin 354b. Accordingly, the outer peripheral surfaces of molded resin 354a and rebound stopper 23 are out of contact with the inner peripheral surface of molded resin 354b, during piston rod 320 moving.

Disposed on the inner surface of through bore 24 of end cap 312, a sliding seal 25b is in sliding contact with piston rod 320. Above sliding seal 25b is disposed an oil seal 15 having functions of preventing the entry of dust and sealing hermetically. Just below end cap 312 is disposed a magnetically permeable ring 355b. Magnetically permeable ring 355b is a circular plate formed of a soft magnetic material. The outer peripheral surface of magnetically permeable ring 355b is fitted with the inner peripheral surface of the side wall of inner tube 310. The inside diameter of magnetically permeable ring 355b is a little greater than the outside diameter of piston rod 320, to create a clearance between them.

In FIG. 7, L1 indicates a distance between the bottom surface of magnetically permeable ring 355b and the top surface of rebound stopper 23. L2 indicates a distance between the lower end of molded resin 354b and the top surface of magnetically permeable ring 355a. Distance L2 is set greater than distance L1, so that magnetically permeable ring 355a and the lower end of molded resin 354b are out of contact with each other even when piston rod 320 is positioned at a maximum displacement on the rebound stroke. In the shown embodiment, electromagnetic stainless steel and silicon steel may be employed as a soft magnetic material. Wiring harnesses 304a, 304b, 307a, and 307b are formed of inductive materials coated with electrical insulators.

Figure 9:
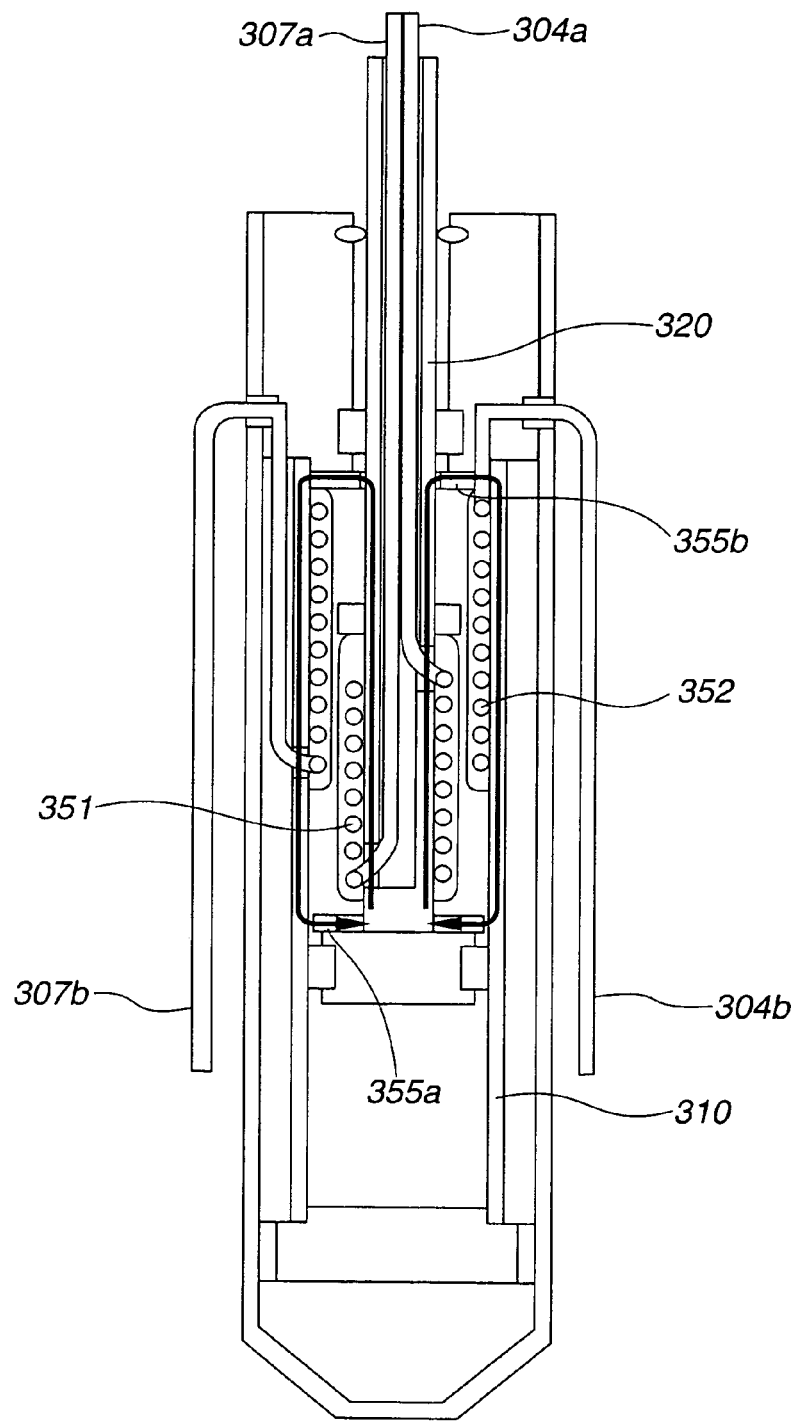
FIG. 9 is a schematic diagram depicting a magnetic flux within the shock absorber in accordance with the third embodiment of the present invention.

The following describes operations of the shock absorber in accordance with the third embodiment. Referring now to FIG. 9, there is shown a magnetic flux within the shock absorber. Piston rod 320, magnetically permeable ring 355b, inner tube 310, magnetically permeable ring 355a, which are formed of a soft magnetic material, form a closed flux path passing through the core and the outside of coaxial coils 351 and 352. Magnetically permeable rings 355a and 355b induce along a radial direction and connect a magnetic flux passing within inner tube 310 in the longitudinal direction and a magnetic flux passing within piston rod 320 in the longitudinal direction. The clearance between the outer peripheral surface of magnetically permeable ring 355a and the inner peripheral surface of the side wall of inner tube 310, and the clearance between the inner peripheral surface of magnetically permeable ring 355b and the outer peripheral surface of piston rod 320, are both small, so that the leakage fluxes at these locations are small.

The electrical energy stored in a battery mounted above the suspension is converted to alternating current by a DC-AC converter. The alternating current is supplied to the pair of wiring harnesses 304a and 307a. In a phase when the current flowing from wiring harness 304a via coil 351 to wiring harness 307a is increasing, the direction of magnetic flux generated is as shown in FIG. 9. The magnetic flux density increases with increasing electric current. In accordance with this change, an electromotive force is induced in coil 352, to raise the potential of wiring harness 304b, and to lower the potential of wiring harness 307b. With an electrical component connected to wiring harnesses 304b and 307b, electric current flows from wiring harness 304b and back to 307b. When the current in coil 351 starts to decrease, the direction of the induced electromotive force applied to coil 352 is turned. Thus, when the magnetic flux generated by coil 351 varies, electromotive force is induced in coil 352 efficiently, in accordance with a rate of change in the magnetic flux density, to supply electric power to an unsprung electrical component via wiring harnesses 304b and 307b.

During the vehicle traveling, a relative displacement between the sprung and unsprung parts of the vehicle results in a relative longitudinal displacement between piston rod 320 and inner tube 310, and also results in twisting the shock absorber. Even under such a condition, electrical coupling or transmission of electrical energy is maintained independently of the relative geometrical relationship. In case the shock absorber is employed in the vehicle equipped with a strut suspension, a twisting effort is generated in accordance with steering operations, to produce a larger relative angular displacement between piston rod 320 and inner tube 310. The shock absorber in accordance with the third embodiment allows this movement and supplies electric power by electromagnetic induction.

In the shown embodiment, the elements formed of a soft magnetic material form a closed flux path for the magnetic flux passing through the core and the outside of coaxial coils. This produces a transformer including a strong electromagnetic coupling. Therefore, electric power is transmitted efficiently in this embodiment.

In case piston 17 is formed of a soft magnetic material, magnetically permeable ring 355a may be omitted from the shock absorber. In this case, piston 17 takes the place of magnetically permeable ring 355a. That is, piston 17 bridges the gap between the magnetic flux passing within inner tube 310 in the longitudinal direction and the magnetic flux passing within piston rod 320 in the longitudinal direction. In case end cap 312 is formed of a soft magnetic material, magnetically permeable ring 355b may be omitted. In this case, end cap 312 takes the place of magnetically permeable ring 355b.

Figure 10:
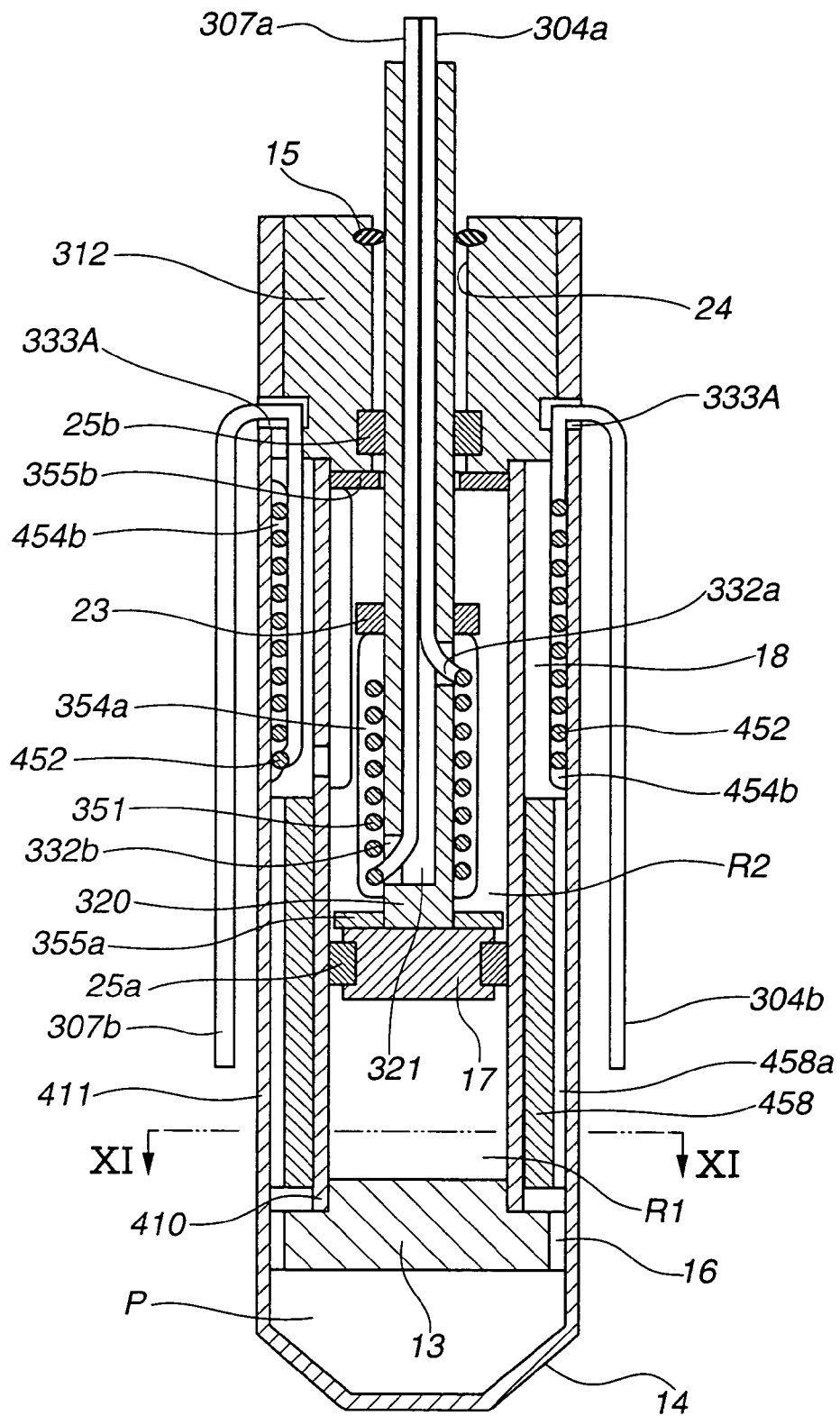
FIG. 10 is a longitudinal sectional view of a shock absorber in accordance with a fourth embodiment of the present invention.

Referring now to FIG. 10, there is shown a twin-tube shock absorber in accordance with a fourth embodiment of the present invention. Common elements shared between the fourth embodiment and the previously discussed embodiments are indicated by the same reference signs. The following describes the structure of the shock absorber, especially added or modified elements other than the common elements. In this embodiment, outer tube 411 is formed of a soft magnetic material. Inner tube 410 is formed of a nonmagnetic material. Coil 452 as a second coil is mounted on a portion of the inner peripheral surface of the side wall of outer tube 411 closer to end cap 312 and is covered and fixed with molded resin 454b, while in the third embodiment coil 352 is mounted on the inner peripheral surface of the side wall of inner tube 310. Coil 452 is connected at its upper end to one end of wiring harness 304b and at its lower end to one end of wiring harness 307b. Wiring harnesses 304b and 307b extend to the bottom portion of end cap 312, and pass via holes 333A that communicate the bottom surface of end cap 312 and the outer peripheral surface of outer tube 411, to be connected to an electrical component below the suspension. Holes 333A are filled with molded resin 454b to ensure the hermeticity.

Figure 11:
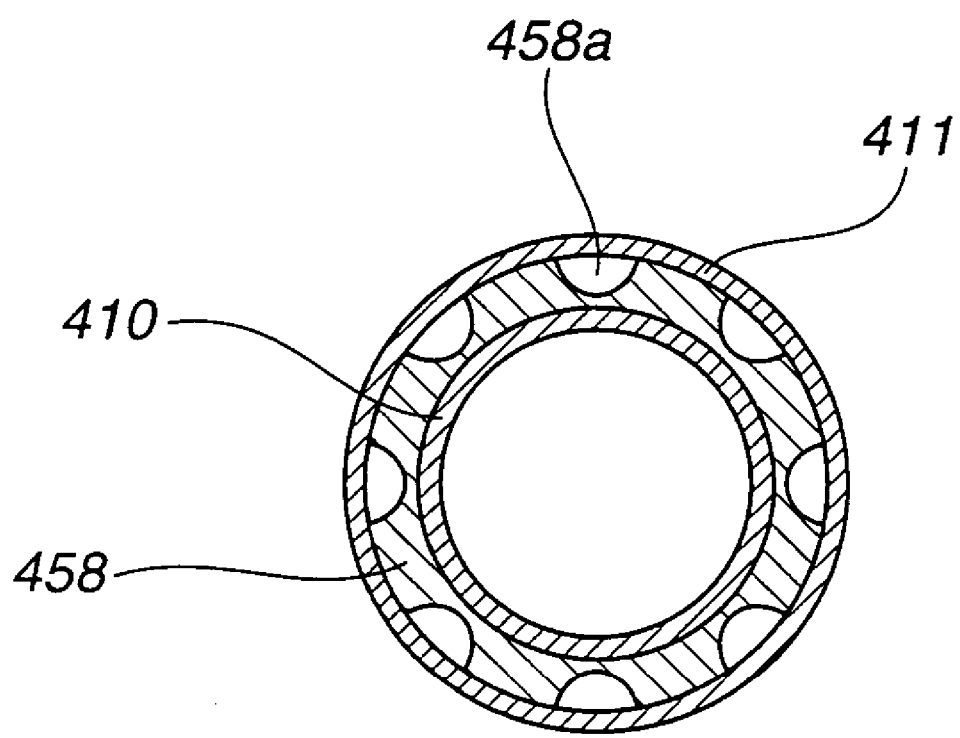
FIG. 11 is a cross sectional view taken along the plane indicated by the line XI-XI in FIG. 10.

In reservoir chamber 18 is disposed a magnetically permeable ring 458, which is a tubular element formed of a soft magnetic material. Magnetically permeable ring 458 extends in the longitudinal direction of the shock absorber between the upper and lower end of a longitudinal stroke of magnetically permeable ring 355a. The upper end of the stroke of magnetically permeable ring 355a is defined by a condition where piston rod 320 is moved upward to bring rebound stopper 23 in contact with magnetically permeable ring 355b. The lower end of the stroke of magnetically permeable ring 355a is defined by a condition where piston rod 320 is moved downward to bring piston 17 in contact with base valve 13. The inner peripheral surface of magnetically permeable ring 458 is in contact with the outer peripheral surface of the side wall of inner tube 410. The outer peripheral surface of magnetically permeable ring 458 is in contact with the inner peripheral surface of the side wall of inner tube 410. FIG. 11 shows a cross sectional view taken along the plane indicated by the line XI-XI in FIG. 10. Magnetically permeable ring 458 includes a plurality of portions defining grooves 458a extending in the longitudinal direction and disposed on the outer peripheral surface thereof. Groove 458a and the inner peripheral surface of the side wall of outer tube 411 define a communication passage. End cap 312 is formed of a soft magnetic material. In this embodiment, electromagnetic stainless steel and silicon steel may be employed as a soft magnetic material, as in the other cases.

Figure 12:
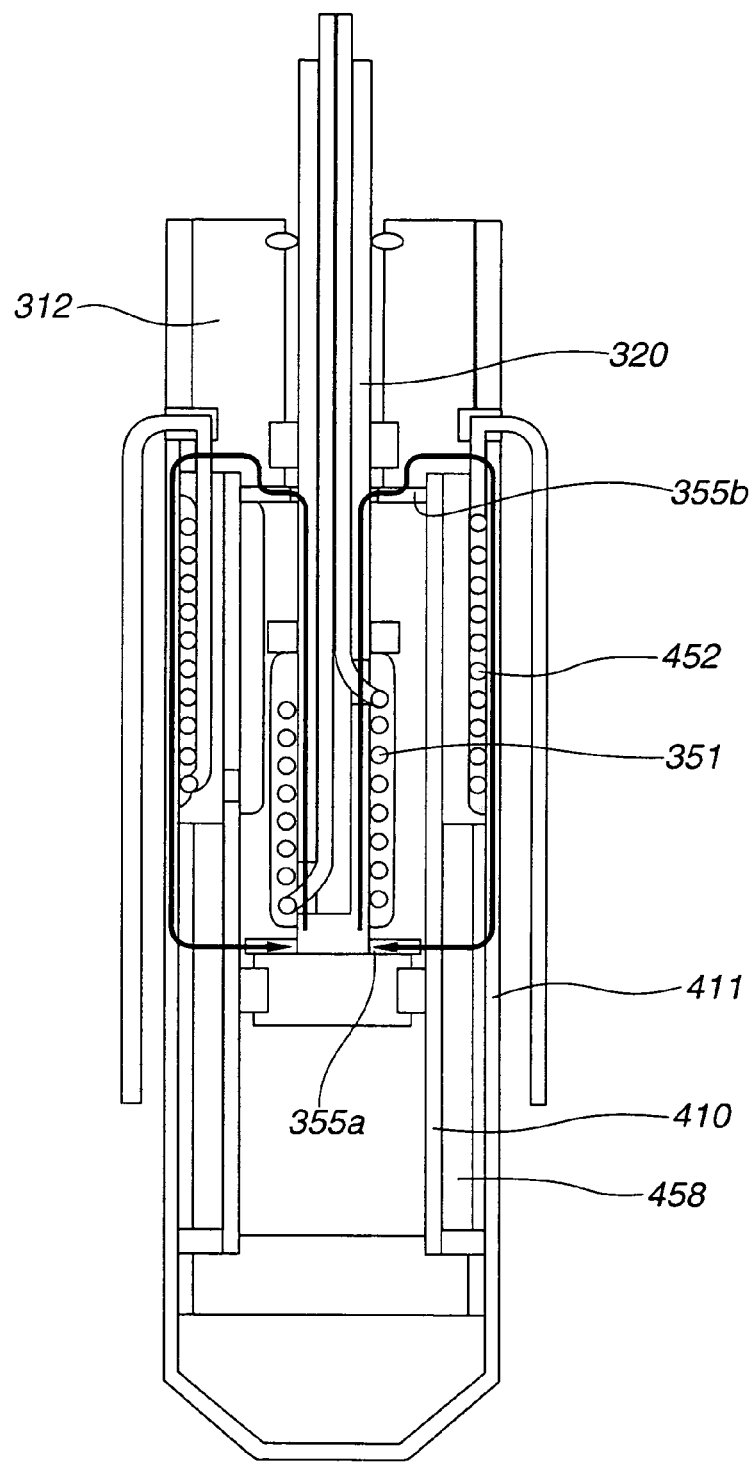
FIG. 12 is a schematic diagram depicting a magnetic flux within the shock absorber in accordance with the fourth embodiment of the present invention.

The following describes operations of the shock absorber in accordance with the fourth embodiment. Referring now to FIG. 12, there is shown a magnetic flux within the shock absorber. Piston rod 320, magnetically permeable ring 355b, end cap 312, outer tube 411, magnetically permeable ring 458, magnetically permeable ring 355a, which are formed of a soft magnetic material, form a closed flux path passing through the core and the outside of coaxial coils 351 and 452. The combination of magnetically permeable rings 355a and 458, and the combination of magnetically permeable ring 355b and end cap 312, induce along a radial direction and connect a magnetic flux passing within outer tube 411 in the longitudinal direction and a magnetic flux passing within piston rod 320 in the longitudinal direction. The clearance between the outer peripheral surface of magnetically permeable ring 355a and the inner peripheral surface of magnetically permeable ring 458, and the clearance between the inner peripheral surface of magnetically permeable ring 355b and the outer peripheral surface of piston rod 320, are both small, so that the leakage fluxes at these locations are small. Thus, magnetically permeable ring 458 serves for producing a radial path for magnetic flux.

Reservoir chamber 18 absorbs the change in the volume of a portion of piston rod 320 in inner tube 410 in accordance with the liner motion of piston rod 320. The hydraulic pressure in reservoir chamber 18 is comparatively low, even during the shock absorber being on the compression stroke. On the other hand, the hydraulic pressure in upper hydraulic chamber R2 rises greatly during the shock absorber being on the expansion stroke. In the shown embodiment, coil 452 is mounted in reservoir chamber 18, so that hole 333A is sealed more easily than hole 333B in the third embodiment.

As in the case of the third embodiment, during the vehicle traveling, a relative displacement between the sprung and unsprung parts of the vehicle results in a relative longitudinal displacement between piston rod 320 and inner tube 410, and also results in twisting the shock absorber. Even under such a condition, electric power supply is maintained independently of the relative geometrical relationship.

In the fourth embodiment, magnetically permeable ring 355b may be omitted from the shock absorber. In case piston 17 is formed of a soft magnetic material, magnetically permeable ring 355a may be omitted from the shock absorber. In this case, piston 17 takes the place of magnetically permeable ring 355a. That is, piston 17 and magnetically permeable ring 458 bridge the gap between the magnetic flux passing within inner tube 410 in the longitudinal direction and the magnetic flux passing within piston rod 320 in the longitudinal direction.

Figure 13:
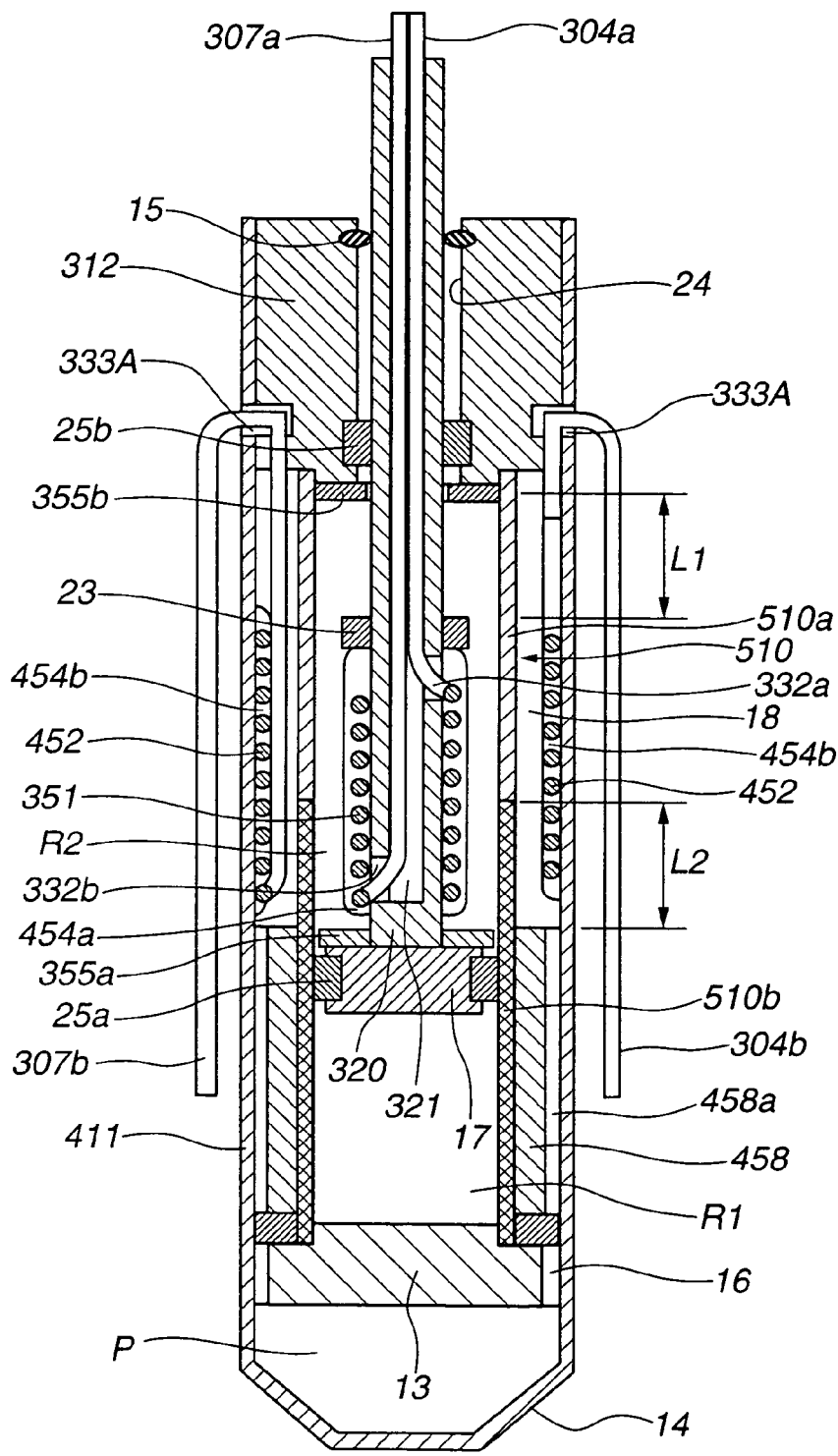
FIG. 13 is a longitudinal sectional view of a shock absorber in accordance with a variation of the fourth embodiment of the present invention.

Referring now to FIG. 13, there is shown a shock absorber in accordance with a variation of the fourth embodiment. Common elements shared between this embodiment and the previously discussed embodiments are indicated by the same reference signs. The following describes the structure of the shock absorber, especially added or modified elements other than the common elements. In this embodiment, inner tube 510 consists of upper inner tube 510a as a first tubular element and lower inner tube 510b as a second tubular element. Coil 452 is located at the same longitudinal position as coil 351 in an established neutral condition where the vehicle is at rest and at normal loaded height, and the steering wheel is in the neutral position. Upper inner tube 510a is formed of a nonmagnetic material such as a nonmagnetic stainless steel. Lower inner tube 510b is formed of a magnetic material such as a magnetic stainless steel. L1 indicates a distance between the bottom surface of magnetically permeable ring 355b and the top surface of rebound stopper 23. L2 indicates a distance between the top surface of magnetically permeable ring 355a and the boundary surface between upper inner tube 510a and lower inner tube 510b. Distance L2 is set equal to distance L1. The upper end of magnetically permeable ring 458 is below the lower end of molded resin 454b, so that hydraulic fluid flows through the upper end of groove 458a. The lower end of magnetically permeable ring 458 is located at a same position as a maximum lower end of piston rod 320 on the compression stroke, near base valve 13. In the fourth embodiment, disposed between the inner peripheral surface of magnetically permeable ring 458 and the outer peripheral surface of magnetically permeable ring 355a, the side wall of inner tube 410 produces a gap of a nonmagnetic material in the flux path. In the variation of the fourth embodiment, replacing the lower potion of inner tube 410 with lower inner tube 510b decreases the leakage flux at this location.

Figure 14:
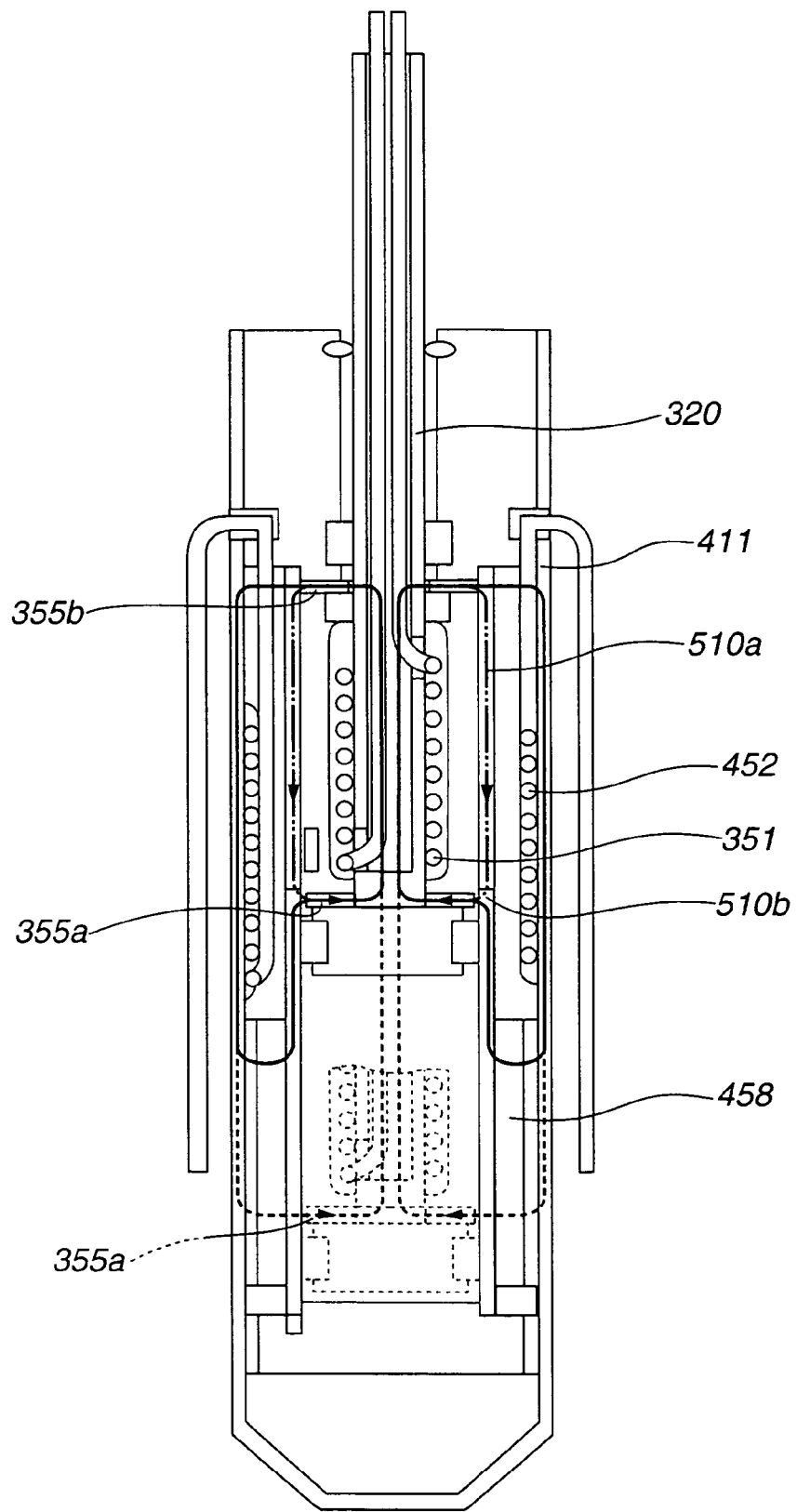
FIG. 14 is a schematic diagram depicting a magnetic flux within the shock absorber in accordance with the variation of the fourth embodiment of the present invention.

FIG. 14 shows a magnetic flux within the shock absorber in accordance with the variation of the fourth embodiment. The broken lines indicate a condition where coil 351 travels downward at a maximum displacement on the compression stroke. The solid lines indicate a condition where coil 351 travels upward at a maximum displacement on the extension stroke. During magnetically permeable ring 355a being located at a longitudinal location between the upper end and the lower end of coil 452, a combination of magnetically permeable ring 355a, magnetically permeable ring 458, lower inner tube 510b, magnetically permeable ring 355b, and end cap 312, induces along a radial direction and connects a magnetic flux passing through outer tube 411 in the longitudinal direction and a magnetic flux passing through piston rod 320 in the longitudinal direction. In this embodiment, there is no magnetic flux as shown by the imaginary lines, which passes between coil 351 and coil 452. Therefore, coil 452 may be mounted apart from end cap 312 in this embodiment, while coil 352 or 452 is close to end cap 312 in the third or fourth embodiment.

In this embodiment, the leakage flux is smaller than in the fourth embodiment. This results in a transformer including a strong electromagnetic coupling. Therefore, electric power is transmitted more efficiently in this embodiment. During the shock absorber being in the neutral condition, coil 351 and coil 452 are in a same longitudinal location. Since the neutral condition appears most frequently during the vehicle traveling, this arrangement leads to an efficient electric power supply.

In the shown embodiments, the upper end portion of the piston rod, which extends out of the end cap, is connected to a sprung component, and the outer tube is connected to an unsprung component. This configuration may be inverted. That is, the upper end portion of the piston rod, which extends out of the end cap, is connected to an unsprung component, and the outer tube is connected to a sprung component.

In the third embodiment, outer tube 311 and end cap 312 may be formed of a soft magnetic material. Furthermore, magnetically permeable ring 458 may be mounted as in the case of the fourth embodiment. In this case, the magnetic flux passes through both of inner tube 310 and outer tube 311, which increases the cross-sectional area of the flux path. This raises a level of saturation of magnetic flux, resulting in an efficient transmission of electric power. In the third embodiment, a single-tube shock absorber may be employed.

In the fourth embodiment and its variation, coil 452 is fixed on the inner peripheral surface of outer tube 411. Alternatively, coil 452 may be fixed on the outer peripheral surface of the side wall of inner tube 410.

The elements such as brush 1, electrode plate 8, and coil 351, which are mounted on the outer peripheral surface of the rod for serving for the electrical coupling, are referred as a first conductive element. The elements such as inner tube 10, brush 5, electrode plate 208, coil 352, and coil 452, which are mounted within the tube for serving for the electrical coupling, are referred as a second conductive element. In the first and second embodiments, the first conductive element and the second conductive element are in sliding contact with is each other. In the other embodiments, the first conductive element and the second conductive element are out of contact with each other.

This application is based on a prior Japanese Patent Application No. 2003-291058 filed Aug. 11, 2003, and a prior Japanese Patent Application No. 2003-310459 filed Sep. 2, 2003. The entire contents of these Japanese Patent Applications Nos. 2003-291058 and 2003-310459 are incorporated herein by reference.

While the foregoing is a description of the preferred embodiments carried out the invention, it will be understood that the invention is not limited to the particular embodiments shown and described herein, but that various changes and modifications may be made without departing from the scope of this invention as defined by the following claims.

What is claimed is:

1. A shock absorber comprising:
   a main tube having one end closed;
   a rod having one end inserted within the main tube for motion in its longitudinal direction;
   a first conductive element mounted on an outer peripheral surface of the rod; and
   a second conductive element mounted within the main tube and coupled electrically with the first conductive element in such a manner to allow transmission of electric power therebetween,
   the main tube including:
      an inner tube including the second conductive element; and
      an outer tube having the closed end, surrounding the inner tube, and defining a sealed reservoir chamber for working fluid with the inner tube, the sealed reservoir chamber being adapted to absorb change in amount of the working fluid present within a sealed hydraulic chamber of the inner tube within which the one end of the rod is arranged to move,
   wherein:
   at least one of the first conductive element and the second conductive element extends along a path of the motion of the rod, to hold the electrical coupling between the first conductive element and the second conductive element;
   the first conductive element and the second conductive element are in sliding contact with each other;
   one of the conductive elements is a brush;
   the other conductive element is an electrode plate extending along the path of the motion of the rod;
   the main tube includes an end cap at its other end;
   the end cap includes a portion defining a through bore in sliding contact with the rod and a portion defining a recess in an inner surface of the through bore;
   the brush is mounted in the recess; and
   the electrode plate is located on the outer peripheral surface of the rod and extending longitudinally so as to keep in contact with the brush.

2. The shock absorber as claimed in claim 1, wherein the brush is rotatable with respect to the electrode plate on a longitudinal axis of the rod.

3. The shock absorber as claimed in claim 1, further comprising:
   a plurality of the combinations of the brush and the electrode plate, insulated from each other.

4. The shock absorber as claimed in claim 3, wherein the brushes are disposed at a longitudinal location of the through bore, surrounding the rod; the electrode plates are disposed on the rod with a clearance therebetween; and each of the electrode plates is facing an associated one of the brushes.

5. The shock absorber as claimed in claim 1, wherein the brush is biased toward the electrode plate to ensure the electrical coupling.

6. The shock absorber as claimed in claim 5, comprising a plurality of the brushes, wherein the brushes are disposed to bring the biasing forces in balance.

7. The shock absorber as claimed in claim 1,
wherein the second conductive element is in direct contact with the first conductive element for conductive coupling.

8. A shock absorber comprising:
a main tube having one end closed;
a rod having one end inserted within the main tube for motion in its longitudinal direction;
a first conductive element mounted on an outer peripheral surface of the rod; and
a second conductive element mounted within the main tube and coupled electrically with the first conductive element in such a manner to allow transmission of electric power therebetween,
the main tube including:
an inner tube including the second conductive element; and
an outer tube having the closed end, surrounding the inner tube, and defining a sealed reservoir chamber for working fluid with the inner tube, the sealed reservoir chamber being connected through a base valve to a sealed hydraulic chamber of the inner tube within which the one end of the rod is arranged to move, and adapted to absorb change in amount of the working fluid present within the hydraulic chamber of the inner tube,
wherein:
at least one of the first conductive element and the second conductive element extends along a path of the motion of the rod, to hold the electrical coupling between the first conductive element and the second conductive element;
the first conductive element and the second conductive element are in sliding contact with each other;
one of the conductive elements is a brush;
the other conductive element is an electrode plate extending along the path of the motion of the rod;
the main tube includes an end cap at its other end;
the end cap includes a portion defining a through bore in sliding contact with the rod and a portion defining a recess in an inner surface of the through bore;
the brush is mounted in the recess; and
the electrode plate is located on the outer peripheral surface of the rod and extending longitudinally so as to keep in contact with the brush.

9. The shock absorber as claimed in claim 8,
wherein the second conductive element is in direct contact with the first conductive element for conductive coupling.

* * * * *